US010538395B2

(12) United States Patent
Schneuing et al.

(10) Patent No.: US 10,538,395 B2
(45) Date of Patent: Jan. 21, 2020

(54) MATRIX SORTER

(71) Applicant: Vanderlande Industries B.V., Veghel (NL)

(72) Inventors: Ralf Ferdinand Schneuing, Bielefeld (DE); Andreas Dau, Bargtheide (DE)

(73) Assignee: Vanderlande Industries B.V., Veghel (NL)

( * ) Notice: Subject to any disclaimer, the term of this patent is extended or adjusted under 35 U.S.C. 154(b) by 0 days.

(21) Appl. No.: 16/052,852

(22) Filed: Aug. 2, 2018

(65) Prior Publication Data

US 2019/0039834 A1     Feb. 7, 2019

(30) Foreign Application Priority Data

Aug. 4, 2017   (DE) .......................... 10 2017 117 713

(51) Int. Cl.
    *B65G 47/52*    (2006.01)

(52) U.S. Cl.
    CPC ................................... *B65G 47/52* (2013.01)

(58) Field of Classification Search
    CPC ....... B65G 47/52; B07C 5/3412; B07C 5/346; Y10S 198/958
    USPC .................... 198/436, 437, 343.1, 347.4, 958
    See application file for complete search history.

(56) References Cited

U.S. PATENT DOCUMENTS

| | | | | |
|---|---|---|---|---|
| 3,351,177 A | * | 11/1967 | Mulligan | ............... B65G 37/00 198/346.2 |
| 3,841,205 A | * | 10/1974 | Niehaus | .................. B65B 57/20 198/349 |
| 4,241,293 A | * | 12/1980 | Bross | ...................... G06M 7/00 198/958 |
| 4,244,672 A | | 1/1981 | Lund | |
| 4,410,078 A | * | 10/1983 | Shields | ..................... B07C 5/02 198/358 |

(Continued)

FOREIGN PATENT DOCUMENTS

| | | |
|---|---|---|
| DE | 43 35 637 C1 | 6/1995 |
| DE | 100 39 394 C1 | 9/2001 |

(Continued)

OTHER PUBLICATIONS

Extended European Search Report for European Application No. 18183893.9, dated Dec. 20, 2018.

(Continued)

*Primary Examiner* — Joseph A Dillon, Jr.
(74) *Attorney, Agent, or Firm* — Wolf, Greenfield & Sacks, P.C.

(57) ABSTRACT

The present application relates to an apparatus for sorting a plurality of different objects and a corresponding method. The apparatus comprises at least one first sorting stage with at least two sorting lines, each having an input end and an output end. The input ends of the sorting lines of the first sorting stage are connected to an infeed conveyor for feeding the objects, and the output ends of the sorting lines of the first sorting stage are connected to a first transport conveyor for carrying the objects further. Arranged at the output ends of each of the sorting lines is an interrupter, which is designed to individually let out objects from the respective sorting line, and arranged at the output ends of each of the sorting lines is a device for counting and/or identifying the objects let out of the respective sorting line.

8 Claims, 2 Drawing Sheets

(56) References Cited

U.S. PATENT DOCUMENTS

| | | | | |
|---|---|---|---|---|
| 4,597,495 | A | * | 7/1986 | Knosby ................ A01K 11/006 104/88.03 |
| 5,687,850 | A | * | 11/1997 | Speckhart ............. B07C 5/3412 209/2 |
| 5,799,800 | A | | 9/1998 | Lux |
| 6,050,421 | A | | 4/2000 | Hansen |
| 6,677,548 | B2 | | 1/2004 | Robu et al. |
| 7,971,527 | B2 | * | 7/2011 | Bausenwein ........... B41F 17/24 101/35 |
| 9,296,561 | B2 | | 3/2016 | Wend et al. |
| 9,475,656 | B2 | | 10/2016 | Sieksmeier et al. |
| 2002/0053535 | A1 | | 5/2002 | Robu et al. |
| 2004/0074824 | A1 | * | 4/2004 | Uchikura ............. B07C 5/3412 209/653 |
| 2005/0078786 | A1 | * | 4/2005 | Sommer, Jr. .......... B07C 5/3427 378/49 |
| 2012/0097501 | A1 | * | 4/2012 | Layne ...................... B07C 3/08 198/570 |
| 2014/0303770 | A1 | | 10/2014 | Wend et al. |
| 2015/0151913 | A1 | | 6/2015 | Wong et al. |
| 2015/0232284 | A1 | | 8/2015 | Sieksmeier et al. |
| 2016/0052726 | A1 | * | 2/2016 | Steeber .............. B65G 47/5127 198/347.4 |

FOREIGN PATENT DOCUMENTS

| | | |
|---|---|---|
| DE | 101 45 606 A1 | 4/2003 |
| DE | 10 2011 103 194 A1 | 12/2012 |
| DE | 10 2013 206 240 A1 | 10/2014 |
| DE | 10 2014 203 118 A1 | 8/2015 |
| EP | 0 516 970 A1 | 12/1992 |
| GB | 2 368 811 A | 5/2002 |
| JP | H02-124876 U | 10/1990 |
| JP | H05-269443 A | 10/1993 |
| JP | 2008-156128 A | 7/2008 |
| JP | 2009-298556 A | 12/2009 |
| JP | 2013-245087 A | 12/2013 |
| JP | 2015-171926 A | 10/2015 |

OTHER PUBLICATIONS

Partial English translation of Office Action for Japanese Application No. 2018-146636, dated Jul. 29, 2019, 2 pages.
JP2018-146636, Jul. 29, 2019, Office Action.

* cited by examiner

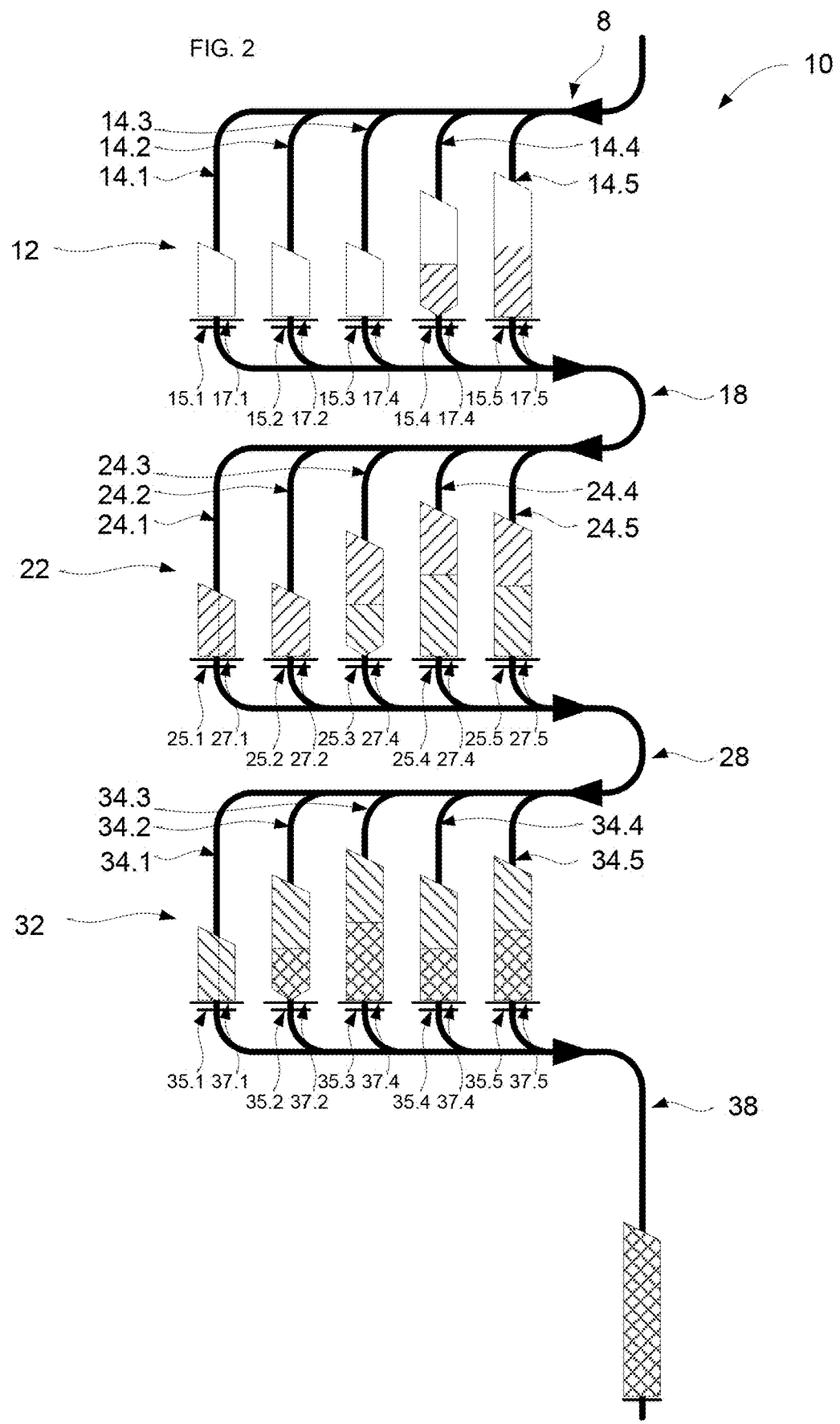

MATRIX SORTER

RELATED APPLICATIONS

Foreign priority benefits are claimed under 35 U.S.C. § 119(a)-(d) or 35 U.S.C. § 365(b) of German application number 102017117713.2, filed Aug. 4, 2017. The entire contents of these applications are incorporated herein by herein by reference in their entirety.

TECHNICAL FIELD

The present invention relates to an apparatus and a method for sorting a plurality of different objects. The apparatus comprises at least one first sorting stage with at least two sorting lines each having an input end and an output end. The input ends of the sorting lines of the first sorting stage are connected to an infeed conveyor for feeding the objects, and the output ends of the sorting lines of the first sorting stage are connected to a first transport conveyor for carrying the objects further.

PRIOR ART

Large quantities of objects are handled in a mail-order centre of an online retailer or similar facilities. The objects are stored in large warehouses and, depending on the orders received, are taken out of the warehouses in batches and ultimately fed to a packing station. To ensure efficient handling of the warehouse, the objects are not removed in the sequence of their order placement but according to their arrangement in the warehouse. As a result, the objects to be shipped cannot reach the packing station directly in the sequence required by the order placement but must first be sorted so as to be packed subsequently in packages or the like and shipped in the combination desired by the customer.

The size of a batch of objects taken out of the warehouse results, among other things, from the capacity of the transport out of the warehouse to the packing station.

It is generally known in prior art to sort objects, for example mail-order goods of a mail-order company, in an automated process. There are various processes for doing this. For example, DE 21 10 390 A1 discloses a sorting process. This process is basically also suitable for use in a mail-order centre of an online retailer.

Starting from an initial sequence taken out of the warehouse in a batch, the objects are brought into a final sequence determined by the orders, the regrouping taking place using sorting stages. For this purpose, ordinal numbers in ascending order are assigned to the objects in the desired final sequence and these ordinal numbers are expressed in positional notation, the number of available sorting stages being used as the basis for the positional notation. Individual sorting lines of the sorting stages are then each assigned one digit of the position corresponding to the sorting stage. Then, in a first regrouping step, the objects are arranged in order according to the digit of their lowest position (in the first sorting stage) and then in a further regrouping step—starting in each case from the grouping already achieved—according to the digit of the higher positions in the sorting lines of the sorting stages.

This process is already used in this form in so-called matrix sorters. It enables fully automated and reliable sorting of the objects in any desired sequence. However, there is still room for improvement with regard to the time required for sorting. A second batch of objects to be sorted cannot be fed to the first sorting stage until the first batch has been removed completely from the first sorting stage so as not to mess up the sorting. This leads to relatively long idle times during which the sorting system is used not for sorting but merely for moving the objects.

A first possibility for improvement lies in dividing the sorting lines of each sorting stage into two equally sized partial sorting lines by inserting an interrupter centrally along the sorting line. This interrupter divides the sorting lines into a first and a second part. As soon as a batch has been completely received in the first part of the sorting stage, the interrupter of the sorting lines is opened and the objects slip into the second part of the sorting lines and the interrupter closes again. While the objects are gradually carried out of the sorting lines of the second part and transported onwards, introduction of the objects of the next batch can already begin.

The disadvantage of this solution, however, is initially still non-optimal utilization of the system at all times because the objects need around 5 seconds to slip, for example, from the first part into the second part and subsequently another 2 seconds are waited for safety's sake before the objects of the next batch are introduced.

In addition, the problem existing in sorting systems in the online trading sector is that the products to be handled vary greatly in size. While a package of a T-shirt takes up only a few centimeters of space, a package of winter boots regularly occupies 30 to 50 centimeters of space along the sorting line. The sorting line would have to be designed in such a way that the maximum number of objects per sorting line (e.g. 10 objects) can fit on the sorting line with the maximum elongation (e.g. 50 cm). This situation, however, is very rare and results in a considerable space requirement. To find a good compromise here, it is possible to calculate with the average elongation of the objects, it being necessary in rare cases to intervene manually in the sorting if, by way of exception, many large objects have to be lined up one behind the other on a sorting line.

This problem generally exists in every sorting line but doubles in the case of an embodiment providing a central interrupter.

SUMMARY OF THE INVENTION

In light of the known prior art, it is an object of the present invention to provide an apparatus of the above technical field and a corresponding method which permits more efficient use. The more efficient use preferably relates to a time saving in the processing of the individual objects and/or a space saving in the design of the individual sorting lines/sorting stages. Both lead to lower costs when making and operating the apparatus.

An apparatus according to the invention for sorting a plurality of different objects comprises at least one first sorting stage with at least two sorting lines, each with an input end and an output end, the input ends of the sorting lines of the first sorting stage being connected to an infeed conveyor for feeding the objects and the output ends of the sorting lines of the first sorting stage being connected to a first transport conveyor for carrying the objects further. Arranged at the output ends of each of the sorting lines is an interrupter, which is designed to individually let out objects from the respective sorting line, and arranged at the output ends of each of the sorting lines is a device for counting and/or identifying the objects let out of the respective sorting line.

Due to the interrupter at the output end of the sorting lines, the objects of the sorting line can be let out individually, the device for counting and/or identifying being able to ensure that precisely those objects in the sorting line that belong to a defined batch are let out. Such objects that do not belong to the defined batch but to the subsequent batch are not let out by the interrupter before the sorting line is completely filled with objects of the relevant batch. The device for counting typically counts the objects physically (by means of contact, light barrier, proximity sensor, camera, etc.). So it merely detects the presence of an object and counts it. In contrast, the device for identifying determines which object is present (by means of NFC reader, RFID reader, bar code reader, camera, etc.). The use of both a device for counting and also a device for identifying increases the reliability of the apparatus. This is because in this way a fault of one of the two devices can be detected by the second device and there is no need to halt operation of the apparatus. This can be significant, for example, if an RFID chip in an object is defective. In this case, the RFID reader would not supply any information but the counter would physically detect that an object is present. Based on the (sorted) sequence or the information about the remaining objects of the sorting line, it is then possible to deduce the identity of the object.

In this way, the central interrupter can be dispensed with because the objects of a batch following the first batch can be introduced into the sorting lines of the sorting stage immediately after the first batch and yet not be let out together with the first batch.

This allows both more efficient use of the sorting stage at all times, because there is no need for the objects to slip out of the first part into the second part (more precisely: because the subsequent objects do not have to wait until the objects of the first batch have slipped into the second part of the sorting line and the central interrupters are closed), and also more efficient use of the space in the sorting stage because the maximum elongation and number of objects per sorting line only has to be expected once in order to achieve reliable admission of the objects into the sorting line.

Thus, a sorting apparatus is created which permits more efficient use, in terms of both time saving and space saving, than in prior art. The apparatus according to the invention thus facilitates lower costs for its production and operation.

The apparatus preferably also comprises at least one second sorting stage with at least two sorting lines, each with an input end and an output end, the output ends of the sorting lines of the first sorting stage being connected via the first transport conveyor to the input ends of the sorting lines of the second sorting stage, so that objects from any one of the sorting lines of the first sorting stage can be transferred into any one of the sorting lines of the second sorting stage, and the output ends of the sorting lines of the second sorting stage being connected to a second transport conveyor for carrying the objects further.

Further preferably, the apparatus also comprises at least one third sorting stage with at least two sorting lines, each with an input end and an output end, the output ends of the sorting lines of the second sorting stage being connected via the second transport conveyor to the input ends of the sorting lines of the third sorting stage, so that objects from any one of the sorting lines of the second sorting stage can be transferred into any one of the sorting lines of the third sorting stage, and the output ends of the sorting lines of the third sorting stage being connected to a third transport conveyor for carrying the objects further.

By using a plurality of sorting stages, more different objects per batch can be sorted in a limited space. The mathematical relationships underlying this statement are basically known. An apparatus with two sorting stages, each of which has ten sorting lines, can sort 10*10, that is 100 objects, requiring 2*10, that is 20 sorting lines for this. An apparatus with only four further sorting lines, which is divided into three sorting stages, each of which has eight sorting lines, can sort 8*8*8, that is 512 objects, and is thus considerably more efficient than the two-stage sorting apparatus. The number of sorting stages determines the power (with identically constructed sorting stages, i.e. equipped with the same number of sorting lines) while the number of sorting lines per sorting stage determines the base. It is therefore advantageous for reasons of space efficiency to use a plurality of sorting stages.

However, the invention can already be used advantageously in a single-stage sorting apparatus.

In preferred embodiments of the apparatus, each sorting stage has five, six, eight or ten sorting lines. An apparatus with three sorting stages, each with six sorting lines, has proven to be particularly efficient overall for most applications and is therefore particularly preferred. The size of a normal batch of objects to be sorted is decisive for selecting the respective numbers of sorting stages and the sorting lines per sorting stage. Multi-stage apparatuses are more worthwhile for larger batches than for smaller batches.

Advantageously, the apparatus is designed to convey the objects suspended, in particular in a pocket suspended on a hanger, in the sorting lines and via the transport conveyor. Such apparatuses are particularly flexible in use and are suitable both for the sorting of clothing transported on hangers and also of objects which fit into transport pockets. Such containers are generally known in the area of conveyor systems and sorting systems and the present invention is generally also suitable for use in apparatuses which transport objects lying or otherwise. However, in addition to its flexibility, an apparatus transporting the objects in a suspended manner has proven in practice to be particularly space-efficient.

The apparatus is preferably designed to sort objects of different sizes. In such apparatuses, the problem is to appropriately and nevertheless efficiently dimension the overall apparatus compared to an apparatus which only transports and sorts objects of a single standardized size. However, even with such apparatuses for objects of a standardized size, the present invention represents an improvement, since here it is possible to improve the efficiency of the apparatus in terms of time.

Advantageously, the apparatus for counting and/or identifying the objects let out of the respective sorting line has an RFID reader. The RFID technology has turned out to be particularly efficient for use in the sorting apparatus according to the invention. However, it is also possible to use other devices for counting and/or identifying, some of which have already been mentioned above.

The apparatus described allows more efficient use compared to the known prior art. The more efficient use relates in preferred embodiments both to a time saving in the processing of the individual objects and also a space saving in the design of the individual sorting lines/sorting stages. Individual embodiments achieve only one of these advantages, others achieve both.

The method according to the invention for sorting a plurality of batches composed of a plurality of different objects uses an apparatus according to the invention, preferably a preferred apparatus, as has been described above. The method comprises feeding a first batch to the first sorting stage and sorting the plurality of objects of the first batch into the sorting lines of the first sorting stage. It further comprises carrying the first batch out of the first sorting stage and feeding a second batch to the first sorting stage and sorting the plurality of objects of the second batch into the sorting lines of the first sorting stage before the first batch has been completely carried further out of the first sorting stage. The objects of the first batch to be carried further are counted and/or identified and, based on this, the interrupters only let out objects of the first batch but keep objects of the second batch in the sorting line until the second batch has been fed completely to the first sorting stage.

Using this method, the apparatus according to the invention can be used particularly efficiently.

A preferred method uses a multi-stage apparatus, as described above. It comprises carrying the first batch out of the second sorting stage, feeding the second batch to the second sorting stage and sorting the plurality of objects of the second batch into the sorting lines of the second sorting stage before the first batch has been completely carried further out of the second sorting stage, and feeding a third batch to the first sorting stage and sorting the plurality of objects of the third batch into the sorting lines of the first sorting stage before the second batch has been completely carried further out of the second sorting stage and has been fed to the second sorting stage.

The present invention is particularly advantageous in multi-stage apparatuses in which a plurality of batches can be sorted simultaneously (distributed among the various stages). The invention is particularly advantageous here because the time saving and also the space saving are achieved repeatedly in each sorting stage. Thus, the invention is particularly worthwhile in apparatuses with a plurality of sorting stages, although it is already advantageous in apparatuses with only one sorting stage.

The method according to the invention and in particular the preferred configuration of the method uses the sorting apparatus more efficiently than is known in prior art. The more efficient use preferably relates to a time saving in the processing of the individual objects and/or a space saving in the design of the individual sorting lines/sorting stages.

Further features and advantages of the invention emerge from the following description of the figures and the claims in their entirety.

BRIEF DESCRIPTION OF THE FIGURES

FIG. 2 is a schematic illustration corresponding to FIG. 1 of a preferred use of a sorting apparatus with three sorting stages and five sorting lines each.

MODES OF CARRYING OUT THE INVENTION

Figure 1:
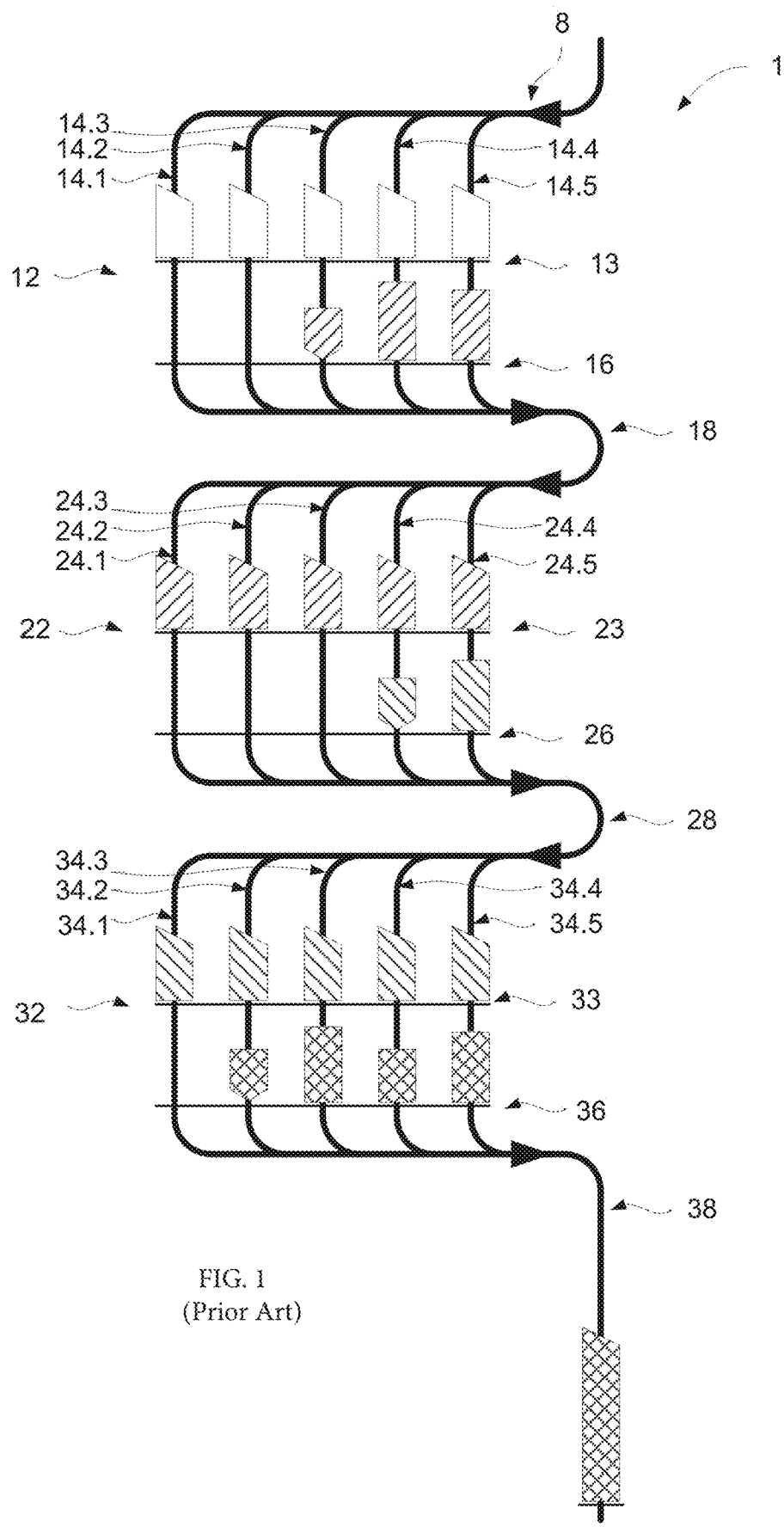
FIG. 1 is a schematic illustration of a use of a prior art sorting apparatus with three sorting stages and five sorting lines each.

FIG. 1 shows a diagram of a sorting apparatus 1 with three sorting stages 12, 22, 32, which each have five sorting lines 14.1, 14.2, 14.3, 14.4, 14.5, 24.1, 24.2, 24.3, 24.4, 24.5, 34.1, 34.2, 34.3, 34.4, 34.5. In the upper region there is an infeed conveyor 8 by means of which objects of the first sorting stage 12 are fed in and sorted into the sorting lines 14.1, 14.2, 14.3, 14.4, 14.5.

Located centrally along the sorting lines 14.1, 14.2, 14.3, 14.4, 14.5, 24.1, 24.2, 24.3, 24.4, 24.5, 34.1, 34.2, 34.3, 34.4, 34.5 of each of the sorting stages 12, 22, 32, in the prior art apparatus, is a first interrupter 13, 23, 33, which divides each of the sorting lines 14.1, 14.2, 14.3, 14.4, 14.5, 24.1, 24.2, 24.3, 24.4, 24.5, 34.1, 34.2, 34.3, 34.4, 34.5 into a first part and a second part.

When the first batch of objects is sorted into the respective sorting stage 12, 22, 32, the objects are initially in the first (upper) part of the sorting lines 14.1, 14.2, 14.3, 14.4, 14.5, 24.1, 24.2, 24.3, 24.4, 24.5, 34.1, 34.2, 34.3, 34.4, 34.5. The first interrupter 13, 23, 33 is then opened and the objects slip over a period of 5 seconds, for example, out of the first part into the second part of the sorting lines 14.1, 14.2, 14.3, 14.4, 14.5, 24.1, 24.2, 24.3, 24.4, 24.5, 34.1, 34.2, 34.3, 34.4, 34.5 where they are stopped by second interrupters 16, 26, 36, namely by one for each sorting line 14.1, 14.2, 14.3, 14.4, 14.5, 24.1, 24.2, 24.3, 24.4, 24.5, 34.1, 34.2, 34.3, 34.4, 34.5, at the output end of the sorting lines 14.1, 14.2, 14.3, 14.4, 14.5, 24.1, 24.2, 24.3, 24.4, 24.5, 34.1, 34.2, 34.3, 34.4, 34.5. After the predetermined time of 5 seconds, the first interrupter 13, 23, 33 is held open for another 2 seconds to ensure that no object of the first batch is still in one of the first parts of the sorting lines 14.1, 14.2, 14.3, 14.4, 14.5, 24.1, 24.2, 24.3, 24.4, 24.5, 34.1, 34.2, 34.3, 34.4, 34.5.

When the interrupter 13 of the first sorting stage 12 is closed again, the second batch can be sorted into the first part of the first sorting stage 12, while the objects of the second batch are transferred via a transport conveyor 18 out of the first sorting stage 12 into the second sorting stage 22 and sorted there. The transfer out of the first sorting stage 12 into the second sorting stage 22 takes place by opening the second interrupters 16 in a sequence according to the arrangement of the sorting lines 14.1, 14.2, 14.3, 14.4, 14.5 of the first sorting stage 12. The second interrupters 16 are opened once until the objects of the respective sorting line 14.1, 14.2, 14.3, 14.4, 14.5 have left it. For example, the second interrupter 16 of the first sorting line 14.1 is only opened until the objects of this sorting line 14.1 have left it. Then the second interrupter 16 is closed again and at the same time, shortly before or shortly thereafter, the second interrupter 16 of the adjacent sorting line 14.2 is opened and so on. This process is carried out until the objects have been transferred out of the second part of the first sorting stage 12 via the transport conveyor 18 into the second sorting stage 22.

While transferring and sorting the objects into the second sorting stage 22, more precisely into the sorting lines 24.1, 24.2, 24.3, 24.4, 24.5 of the second sorting stage 22, the second batch is sorted into the first sorting stage 12 so that it is possible by means of the interrupter 13, 23, 33 to use the sorting stages 12, 22, 32 more efficiently than if it were necessary to wait until the first batch was not only completely sorted and transferred out of the first part into the second part, but also had completely left the respective sorting stage 12, 22, 32 (which takes place one sorting line after another, not at the same time as when slipping out of the respective first part into the second part of the sorting lines).

This process is basically carried out for each sorting stage 12, 22, 32 and reference is made in this regard to the description of using the first sorting stage 12. The second sorting stage 22 also has five sorting lines 24.1, 24.2, 24.3, 24.4, 24.5, a first interrupter 23 and second interrupter 26 and is connected to the third sorting stage 32 via a second transport conveyor 28. The third sorting stage 32 also has five sorting lines 34.1, 34.2, 34.3, 34.4, 34.5, a first interrupter 33 and second interrupter 36 and the objects from the third sorting stage 32 are carried further via a third transport conveyor 38 to the packing station, in the embodiment shown here.

The batches of objects shown in FIGS. 1 and 2 are illustrated according to the logic that the objects on a sorting line, which are currently at rest, are represented as rectangles, the objects on a sorting line which are just being sorted, that is to say objects being fed into the respective sorting line from an upstream direction, are represented as a square with an angled upper edge, and the objects on a sorting line which are just being transferred, that is to say objects being carried further by the respective sorting line in a downstream direction, are represented as a pentagon with pointed bottom. Different batches are differentiated in this case by different hatchings.

FIG. 2 shows a preferred embodiment of apparatus 10 which is similar to that of FIG. 1 as to the basic structure. Here too, three sorting stages 12, 22, 32 are provided, each having five sorting lines 14.1, 14.2, 14.3, 14.4, 14.5, 24.1, 24.2, 24.3, 24.4, 24.5, 34.1, 34.2, 34.3, 34.4, 34.5, and this is provided with a first transport conveyor 18, a second transport conveyor 28 and a third transport conveyor 38. Identical elements are provided with the same reference numbers for the sake of simplicity.

Beyond the apparatus 1 known from FIG. 1, the preferred embodiment 10 has in each of the sorting stages 12, 22, 32, at each of the output ends of the sorting lines 14.1, 14.2, 14.3, 14.4, 14.5, 24.1, 24.2, 24.3, 24.4, 24.5, 34.1, 34.2, 34.3, 34.4, 34.5 an interrupter 15.1, 15.2, 15.3, 15.4, 15.5, 25.1, 25.2, 25.3, 25.4, 25.5, 35.1, 35.2, 35.3, 35.4, 35.5 for individually letting out objects from the respective sorting line 14.1, 14.2, 14.3, 14.4, 14.5, 24.1, 24.2, 24.3, 24.4, 24.5, 34.1, 34.2, 34.3, 34.4, 34.5 and a device 17.1, 17.2, 17.3, 17.4, 17.5, 27.1, 27.2, 27.3, 27.4, 27.5, 37.1, 37.2, 37.3, 37.4, 37.5 for counting and identifying the objects let out of the respective sorting line 14.1, 14.2, 14.3, 14.4, 14.5, 24.1, 24.2, 24.3, 24.4, 24.5, 34.1, 34.2, 34.3, 34.4, 34.5.

It is possible by means of the interrupter 15.1, 15.2, 15.3, 15.4, 15.5, 25.1, 25.2, 25.3, 25.4, 25.5, 35.1, 35.2, 35.3, 35.4, 35.5 and the device 17.1, 17.2, 17.3, 17.4, 17.5, 27.1, 27.2, 27.3, 27.4, 27.5, 37.1, 37.2, 37.3, 37.4, 37.5 for counting and identifying to use the apparatus 10 more efficiently.

Now a first batch, as in the prior art, can be sorted into the respective sorting stage 12, 22, 32. However, once the first batch has been received, it is not necessary to wait until the objects of the batch on the respective sorting line 14.1, 14.2, 14.3, 14.4, 14.5, 24.1, 24.2, 24.3, 24.4, 24.5, 34.1, 34.2, 34.3, 34.4, 34.5 have slipped out of a first part into a second part but rather the second or generally next batch can be sorted directly afterwards into the same sorting stage 12, 22, 32 and at the same time the first or generally preceding batch can be transferred out of the respective sorting stage 12, 22, 32.

This is because the interrupter 15.1, 15.2, 15.3, 15.4, 15.5, 25.1, 25.2, 25.3, 25.4, 25.5, 35.1, 35.2, 35.3, 35.4, 35.5 allows the objects to be let out of the respective sorting stages 12, 22, 32 individually and the device 17.1, 17.2, 17.3, 17.4, 17.5, 27.1, 27.2, 27.3, 27.4, 27.5, 37.1, 37.2, 37.3, 37.4, 37.5 makes it possible to keep track and control so that only the objects of the first (preceding) batch are let out.

Thus the objects leave the sorting lines 14.1, 14.2, 14.3, 14.4, 14.5, 24.1, 24.2, 24.3, 24.4, 24.5, 34.1, 34.2, 34.3, 34.4, 34.5 not in blocks, as in the prior art, but continuously while the objects of the next batch are already being sorted—also continuously. Because of the interrupter 15.1, 15.2, 15.3, 15.4, 15.5, 25.1, 25.2, 25.3, 25.4, 25.5, 35.1, 35.2, 35.3, 35.4, 35.5 and the device 17.1, 17.2, 17.3, 17.4, 17.5, 27.1, 27.2, 27.3, 27.4, 27.5, 37.1, 37.2, 37.3, 37.4, 37.5, there is no need for a centrally arranged interrupter as in the prior art, with the result that the individual sorting lines 14.1, 14.2, 14.3, 14.4, 14.5, 24.1, 24.2, 24.3, 24.4, 24.5, 34.1, 34.2, 34.3, 34.4, 34.5 require only half the length of the sorting lines 14.1, 14.2, 14.3, 14.4, 14.5, 24.1, 24.2, 24.3, 24.4, 24.5, 34.1, 34.2, 34.3, 34.4, 34.5 in the prior art to have the same capacity, or have twice the capacity with the same length.

The invention claimed is:

1. An apparatus for sorting a plurality of different objects, wherein the apparatus comprises:
    at least a first sorting stage with at least two sorting lines, each having an input end and an output end,
    wherein the input ends of the sorting lines of the first sorting stage are connected to an infeed conveyor for feeding the objects, and the output ends of the sorting lines of the first sorting stage are connected to a first transport conveyor for carrying the objects further,
    an interrupter is arranged at the output ends of each of the sorting lines, which is designed to let out objects individually from the respective sorting line, and
    a device for counting and/or identifying the objects let out of the respective sorting line is arranged at the output ends of each of the sorting lines,
    further comprising at least a second sorting stage with at least two sorting lines each having an input end and an output end,
    wherein the output ends of the sorting lines of the first sorting stage are connected via the first transport conveyor to the input ends of the sorting lines of the second sorting stage so that objects from any one of the sorting lines of the first sorting stage can be transferred into any one of the sorting lines of the second sorting stage, and the output ends of the sorting lines of the second sorting stage are connected to a second transport conveyor for carrying the objects further,
    characterized in that,
    an interrupter is arranged at the output ends of each of the sorting lines, which interrupter is designed to individually let out objects from the respective sorting line, and
    a device for counting and/or identifying the objects let out of the respective sorting line is arranged at the output ends of each of the sorting lines.

2. The apparatus according to claim 1, wherein the apparatus further comprises:
    at least a third sorting stage with at least two sorting lines, each having an input end and an output end,
    wherein the output ends of the sorting lines of the second sorting stage are connected via the second transport conveyor to the input ends of the sorting lines of the third sorting stage so that objects from any one of the sorting lines of the second sorting stage can be transferred into any one of the sorting lines of the third sorting stage, and the output ends of the sorting lines of the third sorting stage are connected to a third transport conveyor for carrying the objects further.

3. The apparatus according to claim 1, wherein each sorting stage has five, six, eight or ten sorting lines.

4. The apparatus according to claim 1, which is designed to convey the objects suspended, in particular in a pocket suspended on a hanger, in the sorting lines and via the transport conveyor.

5. The apparatus according to claim 1, which is designed to sort objects of different sizes.

6. The apparatus according to claim 1, wherein the device for counting and/or identifying the objects let out of the respective sorting line has an RFID reader.

7. A method for sorting a plurality of batches composed of a plurality of different objects using the apparatus according to claim 1, wherein the method comprises:
    feeding a first batch to the first sorting stage and sorting the plurality of objects of the first batch into the sorting lines of the first sorting stage, carrying the first batch further out of the first sorting stage, feeding a second batch to the first sorting stage and sorting the plurality of objects of the second batch into the sorting lines of the first sorting stage before the first batch has been completely carried further out of the first sorting stage, wherein the objects of the first batch to be carried further are counted and/or identified and, based on this, the interrupters only let out the objects of the first batch but keep objects of the second batch in the sorting line until the second batch has been fed completely to the first sorting stage.

8. A method for sorting a plurality of batches composed of a plurality of different objects using the apparatus according to claim 2, wherein the method comprises:

feeding a first batch to the first sorting stage and sorting the plurality of objects of the first batch into the sorting lines of the first sorting stage, carrying the first batch further out of the first sorting stage, feeding a second batch to the first sorting stage and sorting the plurality of objects of the second batch into the sorting lines of the first sorting stage before the first batch has been completely carried further out of the first sorting stage, wherein the objects of the first batch to be carried further are counted and/or identified and, based on this, the interrupters only let out the objects of the first batch but keep objects of the second batch in the sorting line until the second batch has been fed completely to the first sorting stage, carrying the first batch further out of the second sorting stage, feeding the second batch to the second sorting stage and sorting the plurality of objects of the second batch into the sorting lines of the second sorting stage before the first batch has been completely carried further out of the second sorting stage, and feeding a third batch to the first sorting stage and sorting the plurality of objects of the third batch into the sorting lines of the first sorting stage before the second batch has been completely carried further out of the first sorting stage and has been fed to the second sorting stage.

* * * * *